United States Patent Office 3,062,848
Patented Nov. 6, 1962

3,062,848
PROCESS FOR 21-ACYLOXYLATION OF 20-KETO STEROIDS AND INTERMEDIATES THEREFOR
Robert Joly, Montmorency, and Jean Jolly, Fontenay-sur-Bois, Seine, France, assignors, by mesne assignments, to Roussel-UCLAF, S.A., Paris, France, a corporation of France
No Drawing. Filed July 25, 1960, Ser. No. 44,851
Claims priority, application France Feb. 10, 1959
17 Claims. (Cl. 260—397.45)

The present invention relates to a novel process for the production of 21-acyloxy-20-keto steroids of the pregnane and allopregnane series having the formula

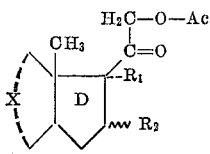

wherein X represent the remaining A, B and C rings of the pregnane molecule, said A, B and C rings are selected from the group consisting of saturated rings, mono-ene rings and diene rings and contain substituents selected from the group consisting of hydrogen, halogen, oxo, hydroxy, lower alkyl and combinations thereof, $R_1$ and $R_2$ are selected from the group consisting of hydrogen, hydroxy, lower alkanoyl and lower alkyl and when taken together are methylene and Ac is the acyl radical of an organic carboxylic acid containing 1 to 12 carbon atoms. The invention also relates to the novel diiodo intermediates having the formula

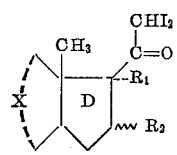

wherein X, $R_1$ and $R_2$ have the above definitions.

Various processes have been heretofore described for the introduction of the acyloxy group in the 21-position of steroids of the pregnane and allopregnane series containing a keto function in the 20-position. This introduction can be effected generally by microbiological means (see Wettstein, Experientia 11, 465, 1955), or also by chemical means. It has been proposed (Hogg et al., J. Am. Chem. Soc. 77, 4436, 1955), to carry out a selective oxalic condensation in the 21-position, followed by iodination, hydrolysis and displacement of the iodine with an alkali metal acylate. More recently, Ringold and Stork (J. Am. Chem. Soc. 80, 250, 1958), have reported a simpler process for the preparation of 21-acetoxy steroids consisting essentially of iodinating the steroid in a mixture of tetrahydrofuran in methanol in the presence of a base such as solid calcium oxide or aqueous sodium hydroxide. The 21-mono-iodo derivative thus obtained is then transformed into the 21-acetoxy derivative by reaction with potassium acetate followed by treatment with aqueous methanolic bimethyl bisulfite in order to eliminate the residual iodine. The overall yield for both of these operations when operating by this process is 60% in the preparation of cortexolone (Substance S) and 40 to 45% for the preparation of cortexone acetate (DOCA). This process is also disclosed as being applicable to the preparation of corticosterone acetate, $\Delta^1$-cortexolone acetate, dehydro corticosterone acetate and pregnane-3α-21-diol-11,20-dione 21-acetate.

The preparation of 21-diiodo-20-keto steroids are also of interest when it is desired to obtain 11β-hydroxylated derivatives starting from a 3,11,20-triketo steroid. It is known that the usual method of preparation involves first the introduction of the acyloxy grouping into the 21-position. However, the ketone function in the 20-position is sterically hindered and the molecule becomes more fragile, so that when it is subsequently desired to protect the two ketone functions in the 3- and 20-positions in the form of the diketal or the disemicarbazone while reducing the ketone function in the 11-position, the reaction is often incomplete or losses occur during the regeneration of the two ketone functions in the 3- and 20-positions because of the ketol group.

The present invention has as its objects an improved process for the 21-acyloxylation of 20-keto steroids of the pregnane and allopregnane series through the new intermediate 21-diiodo derivatives. By this process, yields of above 85% are obtained.

Another object of the invention is the obtaining of novel 21-diiodo derivatives of 20-keto steroids of the pregnane and allopregnane series having the above formula and more particularly:

(a) 21-diiodo-$\Delta^{9(11)}$-pregnene-3α,17α-diol-20-one
(b) 21-diiodo - 16α - methyl-$\Delta^{9(11)}$-pregnene-3α,17α-diol-20-one
(c) 21-diiodo - 16α - methyl-$\Delta^{1,4,9(11)}$-pregnatriene-17α-ol-3,20-dione
(d) 16α,17α-methylene-21-diiodo-pregnane - 3α - ol-11,20-dione
(e) 21-diiodo - 9α - fluoro-16α-methyl-$\Delta^{1,4}$-pregnadiene-11β,17α-diol-3,20-dione
(f) 21-diiodo - $\Delta^4$ - pregnene-11β,17α-diol-3,20-dione and its solvate with one mol of carbon tetrachloride
(g) 21-diiodo - 16α - methyl-5β-pregnane-3α-ol-11,20-dione
(h) 21-diiodo - $\Delta^{1,4}$ - pregnadiene-17α-ol-3,11,20-trione and its solvate with one mol of carbon tetrachloride
(i) 21-diiodo - $\Delta^{1,4}$ - pregnadiene-11β,17α-diol-3,20-dione and its solvate with one mol of carbon tetrachloride
(j) 21-diiodo - 16α - methyl-$\Delta^{4,9(11)}$-pregnadiene-17α-ol-3,20-dione These and other objects of the invention will become more apparent as the description proceeds.

We have found, and our invention relates to, a process for the preparation of 21-acyloxy-20-keto steroids of the pregnane and allopregnane series which are valuable intermediates in the preparation of corticosteroids such as the 21-acetate of 9α-fluoro-hydrocortisone, the 21-acetate of 16α-methyl-9α-fluoro-prednisolone, the 21-acetate of 9α-fluoro-prednisolone and the 21-acetate of 6α,9α-difluoro-prednisolone.

The process according to the present invention comprises reacting at temperatures between above 0° C. and 40° C. iodine in the presence of calcium chloride and calcium oxide or hydroxide with a 20-keto steroid of the pregnane and allopregnane series having the formula

wherein X, $R_1$ and $R_2$ have the above definitions, in an anhydrous organic solvent such as lower alkanols and especially methanol. After termination of the reaction, the 21-diiodo derivative is precipitated out, insoluble calcium compounds are removed as water soluble salts by adding weakly acidic aqueous solution such as weak aqueous acetic acid to the reaction mixture, and the 21-diiodo derivative, thus isolated, is dissolved in an appropriate inert solvent and treated with an alkali metal acylate of an organic carboxylic acid having 1 to 12 carbon atoms, preferably in the presence of a slight amount of the organic carboxylic acid of the acylate.

If the 21-diiodo derivative does not precipitate from the reaction mixture, an insoluble solvate of the 21-diiodo derivative may be formed by the addition of a solvent such as carbon tetrachloride and the solvate may be isolated and used as such for the acyloxylation. If desired, the solvate may be desolvated by taking it up in acetone or ether and crystallizing out the 21-diiodo derivative of the 20-keto steroid. Table I is a flow diagram of the process.

TABLE 1

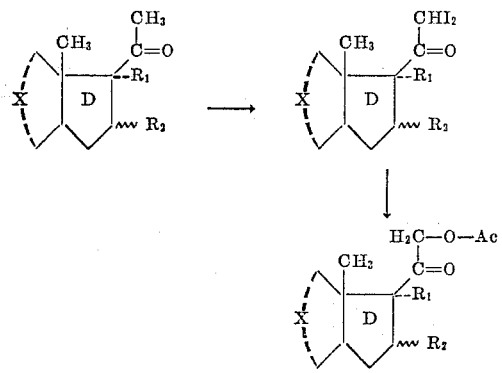

X, $R_1$ and $R_2$ have the above definitions.

In accordance with a preferred embodiment of this invention, a 20-keto steroid of the pregnane and allopregnane series as described above in solution in an appropriate inert organic solvent such as methanol is treated at about 0° to 40° C. (preferably between 26° and 30° C.) with a substantially theoretical quantity of iodine (calculated for the 21-diiodo derivative), to obtain the 21-diiodo derivative. In another mode of operation, a mixture of the starting solvent with another solvent, which makes it possible to render the diiodo derivative insoluble from the moment of its formation, is used. The reaction mixture is poured into iced water containing 2 to 5% acetic acid when the reaction is terminated, and the diiodo derivative is isolated by filtering or centrifuging. The diiodo compound is then treated under reflux with a suspension of potassium acetate in an organic solvent such as acetone containing a small amount of acetic acid. The reaction mixture is cooled and part of the solvent is eliminated. The 21-acylated derivative is precipitated by water and isolated by known procedures, such as by filtering or centrifuging.

Among the alkali metal acylates which are suitable for the practice of this invention are the potassium or sodium salts of organic carboxylic acids having one to twelve carbon atoms. Preferred alkali metal acylates are the potassium salts of alkanoic acids such as acetic acid, propionic acid, formic acid, butyric acid and t-butylacetic acid; other carboxylic acid salts that may be used are salts of aryl acids such as benzoic acid; cycloalkanoic acids such as hexahydrobenzoic acid and cyclopentylpropionoic acid; dicarboxylic acids such as hexahydroterephthalic acid and succinic acid; and aralkanoic acids such as phenylacetic acid. Suitable solvents for the acylation include acetone and dimethylformamide.

Examples of the 20-keto steroids of the pregnane and allopregnane series which may be acylated by the process of the present invention are as follows:

$\Delta^{4,9(11)}$-pregnadiene-3,20-dione
$\Delta^{5,9(11)}$-pregnadiene-3α or β-ol-20-one
$\Delta^{9,(11)}$-pregnene-17α-ol-3,20-dione
$\Delta^{9(11)}$-allopregnene-17α-ol-3,20-dione
$\Delta^{4,9(11)}$-pregnadiene-4-ol-3,20-dione
$\Delta^{4,9(11)}$-pregnadiene-6α or β-ol-3,20-dione
$\Delta^{4,9(11)}$-pregnadiene-3,6,20-trione
$\Delta^{4,9(11)}$-pregnadiene-17α-ol-3,20-dione
$\Delta^{1,4,9(11)}$-pregnatriene-17α-ol-3,20-dione
$\Delta^{4,9(11)}$-pregnadiene-4,17α-diol-3,20-dione
$\Delta^{4,6,9(11)}$-pregnatriene-17α-ol-3,20-dione
6α or 6β-fluoro-$\Delta^{4,9(11)}$-pregnadiene-17α-ol-3,20-dione
$\Delta^{9(11)}$-pregnene-3α or β,17α-diol-20-one
$\Delta^{9(11)}$-allopregnene-3α or β,17α-diol-20-one
$\Delta^{9(11)}$-pregnene-3,20-dione
$\Delta^{9(11)}$-allopregnene-3,20-dione
$\Delta^{4,9(11)}$-pregnadiene-6α or 6β,17α-diol-3,20-dione
$\Delta^{4,9(11)}$-pregnadiene-17α-ol-3,6,20-trione
6α or 6β-methyl-$\Delta^{4,9(11)}$-pregnadiene-17α-ol-3,20-dione
6α or 6β-fluoro-$\Delta^{1,4,9(11)}$-pregnatriene-17α-ol-3,20-dione
$\Delta^{1,4,9(11)}$-pregnatriene-6α or 6β,17α-diol-3,20-dione
6α or 6β-methyl-$\Delta^{1,4,9(11)}$-pregnatriene-17α-ol-3,20-dione
16α or 16β-acetoxy-$\Delta^{1,4,9(11)}$-pregnatriene-17α-ol-3,20-dione
16α or 16β-methyl-$\Delta^{9(11)}$-pregnene-17α-ol-20-one
16α or 16β-methyl-$\Delta^{4,9(11)}$-pregnadiene-17α-ol-20-one
16α or 16β-methyl-$\Delta^{1,4,9(11)}$-pregnatriene-17α-ol-20-one
$\Delta^{1,4}$-pregnadiene-17α-ol-3,11,20-trione
$\Delta^{1,4}$-pregnadiene-11β,17α-diol-3,20-dione
$\Delta^4$-pregnene-17α-ol-3,11,20-trione
9α-fluoro-16α-methyl-$\Delta^{1,4}$-pregnadiene - 11β,17α - diol-3,20-dione
$\Delta^4$-pregnene-11β,17α-diol-3,20-dione
16α or 16β-methyl-$\Delta^{9(11)}$-allopregnene-17α-ol-20-one In the following examples there are described several preferred embodiments to illustrate the invention. However, it should be understood that the invention is not intended to be limited to the specific embodiments.

EXAMPLE 1

*Preparation of 16α-Methyl-21-Acetoxy-$\Delta^{1,4,9(11)}$ Pregnatriene-17α-ol-3,20-Dione*

(A) *Preparation of 16α-methyl-21 - diiodo - $\Delta^{1,4,9(11)}$-pregnatriene-17α-ol-3,20-dione.*—5 gm. of 16α-methyl-$\Delta^{1,4,9(11)}$-pregnatriene-17α-ol-3,20-dione were introduced into 25 cc. of methanol containing 2% calcium chloride. 2.5 gm. of quicklime were added to the steroid solution and then a solution of 7.07 gm. of iodine in 25 cc. of methanol containing 10% calcium chloride was added over a period of two hours while maintaining the temperature at 26° to 28° C. The reaction mixture was cooled and maintained for one hour at −10° C. and then vacuum filtered. The filter cake was washed with iced methanol and introduced into 500 cc. of iced water containing 15 cc. of acetic acid. The resulting suspension was vacuum filtered, washed with water and dried in vacuo at 20 to 25° C. 16α-methyl-21-diiodo-$\Delta^{1,4,9(11)}$-pregnatriene-17α-ol-3,20-dione was obtained in a yield of 90%. The product had a melting point of 243 to 245° C. (with decomposition) and a specific rotation of $$[\alpha]_D^{20} = +127.5° \pm 1.5$$

(c.=1% in chloroform).

*Analysis.*—$C_{22}H_{26}O_3I_2$: Molecular weight=592.27. Calculated: C, 44.61%; H, 4.42%; I, 42.86%. Found: C, 44.8%; H, 4.5%; I, 43.0%.

This product is new.

(B) *Preparation of 16α-methyl-21 - acetoxy - $\Delta^{1,4,9(11)}$-pregnatriene-17α-ol-3,20-dione.*—10 gm. of anhydrous potassium acetate were suspended in 100 cc. of acetone containing 1% water. 0.5 cc. of acetic acid were added, the mixture was heated to 40 to 45° C. while stirring and then 5 gm. of 16α-methyl-21-diiodo-$\Delta^{1,4,9(11)}$-pregnatriene-17α-ol-3,20-dione obtained according to (A) were introduced rapidly into the mixture. The resulting reaction mixture was heated under reflux for 1½ hours and then cooled to 20 to 25° C. It was concentrated in vacuo to a volume of 50 cc., 20 cc. of water were added and the mixture was poured into 500 cc. of iced water. The cooled mixture was maintained for 1 hour at 0° C., vacuum filtered and the filter cake was washed with water and dried at 80° C. 16α-methyl-21-acetoxy-$\Delta^{1,4,9(11)}$-pregnatriene-17α-ol-3,20-dione was thus obtained in a quantitative yield based on the starting 16α-methyl-21-diiodo-$\Delta^{1,4,9(11)}$-pregnatriene-17α-ol-3,20-dione.

The product obtained was in all respects identical to the compound described by Oliveto et al. (J. Am. Chem. Soc. 80, 4431, 1958).

EXAMPLE 2

*Preparation of 16α-Methyl-21-Acetoxy-$\Delta^{9(11)}$ Pregnene-3α,17α-Diol-20-One*

(A) *Preparation of 16α-methyl-21-diiodo-$\Delta^{9(11)}$-pregnene-3α,17α-diol-20-one.*—0.83 gm. of 16α-methyl-$\Delta^{9(11)}$-pregnene-3α,17α-diol-20-one were introduced into 8.4 cc. of methanol containing 5% calcium chloride. 0.83 gm. of quicklime were added, and then, while maintaining the temperature at 27 to 28° C., 1.16 gm. of iodine in 4 cc. of methanol containing 10% calcium chloride were added slowly, each portion being added as soon as the color from the previous portion disappears.

The reaction mixture was allowed to stand at room temperature for 5 minutes and was then poured into 100 cc. of iced water containing 2.5 cc. of acetic acid. The mixture was vacuum filtered and the filter cake was washed with water and dried in vacuo at a temperature of 20° C. The yield was 98% of theory.

This product was used directly for the subsequent operation.

The product is not described in the literature.

(B) *Preparation of 16α-methyl-21-acetoxy-$\Delta^{9(11)}$-pregnene-3α,17α-diol-20-one.*—2 gm. of anhydrous potassium acetate were suspended in 20 cc. of acetone containing 1% water and 0.1 cc. of acetic acid were added. The mixture was heated to 40 to 45° C. while stirring and then 1 gm. of the raw 16α-methyl-21-diiodo-$\Delta^{9(11)}$-pregnene-3α,17α-diol-20-one obtained according to (A) were rapidly added to the mixture. The reaction mixture was refluxed for 1½ hours. It was then cooled to 20 to 25° C. and 10 cc. of acetone were distilled off in vacuo. 5 cc. of water were added to the concentrated mixture and the mixture was poured into 100 cc. of iced water. The aqueous suspension was cooled with ice for 30 minutes and vacuum filtered. The filter cake was washed with water and dried at 80° C. 16α-methyl-21-acetoxy-$\Delta^{9(11)}$-pregnene-3α,17α-diol-20-one was thus obtained in a total yield of 86%, based upon the 16α-methyl-$\Delta^{9(11)}$-pregnene-3α,17α-diol-20-one used as the starting material. The 21-acetoxylated product thus obtained was in the form of small white crystals which were insoluble in water and slightly soluble in ether. They had a melting point of 224–226° C. and a specific rotation of $[\alpha]_D^{20}=+49°$ (c.=0.5% in acetone). This product was in all respects identical to the compound described in the copending, commonly assigned patent application Serial No. 862,491, filed December 29, 1959, entitled "Brominated 17α-Hydroxy-16α-Methyl-$\Delta^{9(11)}$-Pregnene Diones and Process for Their Preparation."

EXAMPLE 3

*Preparation of 21-Acetoxy-$\Delta^{9(11)}$-Pregnene-3α,17α-Diol-20-One*

(A) *Preparation of 21-diiodo-$\Delta^{9(11)}$-pregnene-3α,17α-diol-20-one.*—1 gm. of $\Delta^{9(11)}$-pregnene-3α,17α-diol-20-one was introduced into 10 cc. of methanol containing 5% calcium chloride, 1 gm. of quicklime was added, and then while maintaining the temperature at 26 to 28° C., 1.526 gm. of iodine in 5 cc. of methanol containing 10% calcium chloride were added over a period of 55 minutes, each portion being added as the color from the previous portion disappears. The reaction mixture was allowed to stand for 15 minutes at 25° C. and was then poured slowly into 100 cc. of iced water containing 3 cc. of acetic acid. The mixture was vacuum filtered, the filter cake was washed with water and dried in vacuo at room temperature. The yield was 97% of theory.

This product was used directly for the subsequent operation.

This product has not yet been described in the literature.

(B) *Preparation of 21-acetoxy-$\Delta^{9(11)}$-pregnene-3α,17α-diol-20-one.*—2 gm. of anhydrous potassium acetate were suspended in 20 cc. of acetone containing 1% water and 0.1 cc. of acetic acid was added. The mixture was heated to 40 to 45° C., while stirring, and then 1 gm. of the crude 21-diiodo-$\Delta^{9(11)}$-pregnene-3α,17α-diol-20-one obtained according to (A) was added. The reaction mixture was heated under reflux for 1½ hours. It was then cooled to 20 to 25° C. and 10 cc. of acetone were distilled off in vacuo. 4 cc. of water were added to the concentrated mixture and the mixture was poured into 100 cc. of iced water. The aqueous suspension was cooled with ice for 1 hour and vacuum filtered. The filter cake was washed with water and dried at 80° C. 21-acetoxy-$\Delta^{9(11)}$-pregnene-3α,17α-diol-20-one was obtained in a total yield of 88%. This compound had a melting point of 230–232° C. and a specific rotation of $[\alpha]_D^{20}=+62°$ (c.=0.5% in acetone).

The yield of 88% was calculated on the basis of the starting material, $\Delta^{9(11)}$-pregnene-3α,17α-diol-20-one.

EXAMPLE 4

*Preparation of the Acetate of Dexamethasone*

While mechanically agitating and under a current of nitrogen, 14 cc. of methanol containing 10% calcium chloride, and then 14 gm. of 9α-fluoro-16α-methyl-$\Delta^{1,4}$-pregnadiene-11β,-17α-diol-3,20-dione, described in the copending, commonly assigned U.S. patent application Serial No. 861,783, filed December 24, 1959, were introduced into 56 cc. methanol with the aid of a bromine ampule. The resulting mixture was agitated for a few minutes at 25–27° C. and then 7 gm. of calcium oxide were added. While maintaining the temperature between 26–28° C. and without interrupting either the agitation or the stream of nitrogen, a solution of 18.8 gm. of iodine in a mixture of 42 cc. of methanol containing 10% calcium chloride and 28 cc. of pure methanol was introduced within a period of about forty-five minutes in darkness, while taking care that iodine was not introduced until the color due to the preceding introduction of iodine had disappeared. After all of the iodine solution had been introduced, a slightly yellow suspension was obtained which was agitated for a few minutes more at the same temperature. Thereafter the temperature of the reaction mixture was reduced by outside cooling to —10° to —12° C. and the temperature was maintained at that point for one hour. The mixture of calcium oxide and the diiodo derivative was vacuum filtered. The filter cake was washed with iced methanol, again vacuum filtered and dried at room temperature. It was then introduced into 280 cc. of a mixture of ice and water acidified with 21 cc. acetic acid and the resulting mixture was agitated for half an hour at about 0° C. The 9α-fluoro - 16α - methyl-21-diiodo-$\Delta^{1,4}$-pregnadiene-11β,17α-diol-3,20-dione formed thereby was separated by vacuum filtration, washed with water until the wash water was free from iodine, again vacuum filtered and dried. 20.6 gm. of the diiodo derivative (a yield of 89%) were obtained.

The product contained 39.2% iodine and could be employed as such for the acyloxylation. For analysis, it was recrystallized from aqueous dimethyl formamide. It was soluble in tetrahydrofuran and dimethyl formamide, slightly soluble in methanol, and insoluble in benzene, ether, chloroform and water. It decomposed around 280° C. accompanied by a liberation of iodine. Specific rotation $[\alpha]_D^{20}=+130°$ (c.=1% in tetrahydrofuran).

*Analysis.*—$C_{22}H_{27}O_4FI_2$: Molecular weight=628.28. Calculated: C, 42.05%; H, 4.33%; I, 40.4%. Found: C, 42.1%; H, 4.7%; I, 40.9%.

This compound is not described in the literature.

To acetoxylate it, 20 gm. of the diiodo derivative containing 39.2% iodine, obtained as described above, were introduced into a mixture of 200 cc. of acetone containing 1% water, 2 cc. of acetic acid and 20 gm. of potassium acetate, while agitating under a current of nitrogen and in darkness, and the resulting mixture was refluxed for one and one-half hours without interrupting either the agitation or the current of nitrogen. The reaction mixture first turned orange-yellow and then deep red, accompanied by dissolution of the diiodo derivative, and finally turned pale yellow. The solution was cooled to about 30–40° C., water was added to dissolve the potassium acetate, and the solution was poured into a mixture of ice and water. The cold mixture was agitated for one hour, vacuum filtered and the filter cake was dried. 13.8 gm. of the acetate of dexamethasone were obtained, a yield of 99% with respect to the diiodo derivative, which corresponded to an overall yield of 88.2% with respect to the methyl ketone used as the starting material. By recrystallization from aqueous methylethyl ketone, the extremely pure acetate of dexamethasone was obtained which was identical to the product described in the laterature.

EXAMPLE 5

*Preparation of the Acetate of Hydrocortisone*

While mechanically agitating and in a stream of nitrogen, the following were admixed:

| | Cc. |
|---|---|
| Pure methanol | 90 |
| Methanol containing 10% calcium chloride | 3 |
| Carbon tetrachloride | 180 |

Thereafter, 30 gm. of $\Delta^4$-pregnene-11$\beta$,17$\alpha$-diol-3,20-dione were added to this mixture, the temperature was maintained for a few minutes at 20–25° C. without interrupting either the agitation or the stream of nitrogen, and then 30 gm. of calcium oxide were added to the resulting suspension. After thorough homogenization, the temperature of the mixture was adjusted to 27–28° C. and a solution of 42.6 gm. of iodine in a mixture of 67.5 cc. of methanol containing 10% calcium chloride and 30 cc. of pure methanol was introduced in equal portions over a period of about forty-five minutes while kept in darkness.

The introduction of the iodine solution was regulated in such a fashion that the reaction mixture was discolored before each new introduction of iodine. During this period the reaction mixture was cooled so that the interior temperature was maintained between 26–28° C. After all of the iodine had been introduced, a clear yellow suspension was obtained which was considerably more viscous than at the beginning because of the formation of 21-diiodo-$\Delta^4$-pregnene-11$\beta$,17$\alpha$-diol-3,20-dione. Thereafter, the mixture was cooled to about —10° C. and, after standing for two hours, the mixture of calcium oxide and solvated diiodo derivative was separated by vacuum filtration. The filter cake was washed by trituration with a mixture of two parts of carbon tetrachloride and one part methanol which had also been cooled to about —10° C., and the mixture was vacuum filtered and the filter cake was dried at room temperature. The dry product was introduced in small portions into a mixture of 300 cc. of water and ice and 90 cc. of acetic acid without letting the interior temperature exceed 5–6° C. and while maintaining a thorough agitation. After this introduction was terminated, the mixture was agitated some more at the same temperature for a short period of time, vacuum filtered, and the diiodo derivative was washed by trituration with water. 56.6 gm. of solvated diiodo derivative were obtained, a yield of 87%. The solvated diiodo derivative retained one molecule of carbon tetrachloride of solvation and could be employed as such for the acetoxylation. In order to purify it for analysis, it was dissolved in methanol and carbon tetrachloride was added to the solution. Specific rotation $$[\alpha]_D^{20} = +129°$$

(c.=0.5%, chloroform). It desolvated around 170° C. and melted at about 200–210° C., accompanied by decomposition and liberation of iodine. It was slightly soluble in alcohol and benzene, desolvated upon being taken up in acetone and ether, and even its methanolic solution was only slightly stable.

*Analysis.*—$C_{21}H_{28}O_4I_2 \cdot CCl_4$: Molecular weight=752.11. Calculated: C, 35.13%; H, 3.75%; Cl, 18.85%; I, 33.75%. Found: C, 35.3%; H, 3.6%; Cl, 19.0%; I, 33.8%.

This product is not described in the literature. Upon desolvation it yielded the pure diiodo product, specific rotation $[\alpha]_D^{20} = +158° \pm 1$ (c.=0.5% in chloroform).

It is understood that, as a variation and without departing from the scope of the invention, it is possible to precipitate the reaction mixture resulting from the diiodination directly from aqueous acetic acid instead of first separating the mixture of calcium oxide and diiodo derivative by vacuum filtration. The same product is obtained with a yield of 96%.

In order to transform this diiodo derivative into the acetate of hydrocortisone, first 75 gm. of potassium acetate and then 62.5 gm. of the solvated diiodo derivative previously described 21-diiodo$\Delta^4$-pregnene-11$\beta$,17$\alpha$-diol-3,20-dione) were introduced under mechanical agitation and under a stream of nitrogen into a mixture composed of 1000 cc. of acetone containing 1% water and 5 cc. of acetic acid. Without stopping either the agitation or the stream of nitrogen, the mixture was refluxed in darkness. The diiodo derivative dissolved rapidly and the solution turned first orange-yellow, then brownish-red and finally pale yellow. At the end of an hour and a half, 100 cc. of hot water were added to the boiling solution, the mixture was concentrated by evaporation of the acetone in vacuo and then 500 cc. of hot water were added and the acetone was again driven off by evaporation in vacuo. The acetate of hydrocortisone crystallized as soon as the water was introduced. After having driven off the major portion of the acetone, 33.6 gm. of the acetate of hydrocortisone were obtained, a yield of 99% with respect to the diiodo derivative. After the usual purification, standard acetate of hydrocortisone was obtained, melting point 222–224° C., specific rotation $[\alpha]_D^{20} = +161°$ (c.=1% in dioxane).

EXAMPLE 6

*Preparation of 21-Acetoxy-16$\alpha$-Methyl-5$\beta$-Pregnane 3$\alpha$-Ol-11,20-Dione*

5 gm. of 16$\alpha$-methyl-5$\beta$-pregnane-3$\alpha$-ol-11,20-dione were introduced into a mixture of 20 cc. of pure methanol and 0.5 cc. of methanol containing 10% of calcium chloride under nitrogen; then 2.5 gm. of quicklime were introduced while maintaining the temperature at 26–28° C. A solution of 7.32 gm. iodine in a mixture of 10 cc. of methanol containing 10% of calcium chloride and 5 cc. of pure methanol was introduced by small portions into the reaction mixture in the course of one-half an hour. The reaction mixture was then poured into 450 cc. of water and ice containing 7.5 cc. of acetic acid. The reaction mixture was vacuum filtered, the filter cake was washed with water and dried to give the 21-diiodo derivative.

5 gm. of the diiodo derivative were introduced under an atmosphere of nitrogen in a mixture of 50 cc. of acetone, 0.5 cc. of acetic acid and 7.5 gm. of potassium acetate. The mixture was boiled for an hour and thirty minutes at reflux, then the acetone was evaporated to the half of it and the remainder of the acetone was evaporated after addition of water. The 21-acetyloxy derivative so desired was separated. It was extracted with ether, the ethereal extracts were combined, washed with water, decanted, dried over magnesium sulfate, filtered and the ether evaporated to dryness. The residue crystallized after trituration with isopropyl ether. It was dissolved in benzene and separated by addition of cyclohexane to give a solvate of 21-acetoxy-16$\alpha$-methyl-pregnane-3$\alpha$-ol-11,20-dione. This solvate was taken up in ether and thereafter iced. The desired acetoxyl derivative was allowed to crystallize. This product had a melting point of 137–138° C. and a specific rotation $[\alpha]_D^{20} = +96° \pm 1.5$ (c.=0.5% in chloroform).

EXAMPLE 7

*Preparation of the 21-Acetate of $\Delta^{1,4}$-Pregnadiene-11β, 17α,21-Triol-3,20-Dione (Acetate of $\Delta^1$-Hydrocortisone)*

(A) *Preparation of the 21-diiodo-$\Delta^{1,4}$-pregnadiene-11β, 17α-diol-3,20-dione.*—The following starting suspension was prepared under mechanical agitation:

Methanol _____ cc__ 75
$\Delta^{1,4}$-pregnadiene-11β-17α-diol-3,20-dione _____ gm__ 25
Calcium oxide_____ gm__ 5
Calcium hydroxide_____ gm__ 20
Methanol containing 10% calcium chloride____ cc__ 2.5

Then, while moderately agitating and bubbling nitrogen therethrough at a temperature between 0 and +5° C. in the absence of light, there was added, drop by drop, a solution of 36.86 gm. of iodine in 100 cc. of methanol containing 5% calcium chloride. At the end of the introduction, a very slightly yellow suspension was obtained. The absence of free iodine was verified and in one amount 0.37 gm. of iodine soultion in 1 cc. of methanol containing 5% calcium chloride was added.

The addition of a solution containing 1% iodine in the same solvent in the same conditions was continued until after 15 minutes after the addition, there remained an excess of iodine.

Finally, the suspension was poured into 1,800 cc. of a mixture of ice and water and 75 cc. of acetic acid. The suspension was then vacuum filtered and the precipitate was triturated with water until no further halogen appeared in the wash water. The crystals were then dried.

43.64 gm. of 21-diiodo-$\Delta^{1,4}$-pregnadiene-11β,17α-diol-3,20-dione were obtained, melting about 240° C. (decomposition), specific rotation $[\alpha]_D^{20} = +136° \pm 2$ (c.=0.2% in chloroform), I=42.7–42.9% (theory: 42.57%).

The product which was obtained was utilized in the following step.

The compound is not described in the literature.

The starting compound was prepared after the technique described in Belgian Patent No. 540,478.

(B) *Preparation of the 21-acetate of $\Delta^{1,4}$-pregnadiene-11β,17α,21-triol-3,20-dione (acetate of $\Delta^1$-hydrocortisone).*—50 gm. of potassium acetate and 40 gm. of the diiodo compound produced in step (A) were introduced into a mixture of 160 cc. of acetone containing 1% water, 40 cc. of dimethyl formamide and 10 cc. of acetic acid, the addition being made while refluxing the mixture under agitation.

The reaction mixture was maintained at reflux under agitation in an atmosphere of nitrogen for one hour, then the acetone was distilled off.

The paste-like product obtained was added to 50 cc. of water and cooled to a temperature between about 0 and +5° C. The solution was vacuum filtered and the filter cake washed with water. Raw product so obtained was purified by crystallization from a mixture of acetone and water.

20.73 gm. of the acetate of $\Delta^1$-hydrocortisone having a melting point of 246–247° C. and a specific rotation $[\alpha]_D^{20} = +113.7° \pm 1$ (c.=1% in dioxane) were obtained.

EXAMPLE 8

In applying the steps described above to $\Delta^{1,4}$-pregnadiene-17α-ol-3,11,20-trione, there was obtained, starting from 25 gm. of this product, 44 gm. of 21-diiodo-$\Delta^{1,4}$-pregnadiene-17α-ol-3,11,20-trione which decomposed at about 160° C., I=42.5–42.8%. This product was employed without further purification for the next step of the synthesis. This product having a specific rotation $[\alpha]_D^{20} = +184°$ (c.=0.5% in chloroform) furnished 20.29 gm. of the 21-acetate of $\Delta^{1,4}$-pregnadiene-17α,21-diol-3,11,20-trione having a melting point of 222–223°, then 234–235°, and a specific rotation $[\alpha]_D^{20} = +188°$ (c.=1% in dioxane).

The starting compound was prepared after the technique described in the United States Patent No. 2,923,721.

EXAMPLE 9

(A) *16α-methyl-21-diiodo-$\Delta^{4,9(11)}$-pregnadiene-17α-ol-3,20-dione.*—1000 gm. of 16α-methyl-$\Delta^{4,9(11)}$-pregnadiene-17α-ol-3,20-dione were introduced into a mixture of 4 liters of methanol and 100 cc. of a methanolic solution containing 10% of calcium chloride. The mixture was agitated several minutes, then 200 gm. of quicklime and 800 gm. of calcium hydroxide were added to the suspension formed. A solution was prepared of 1510 gm. of iodine in 2 liters of methanol containing 10% of calcium chloride and diluted with 1 liter of methanol. This solution was then introduced into the mixture containing 16α-methyl-$\Delta^{4,9(11)}$-pregnadiene-17α-ol-3,20-dione under agitation and in an atmosphere of nitrogen and in the absence of light. The introduction was effected by addition of small amounts over a space of about one-half hour. An orange-yellow suspension was obtained which did not contain free iodine. This suspension was poured into a mixture of ice and water containing 10% of acetic acid, agitated for one-half hour, then vacuum filtered and the product obtained was washed with water. The product was dried and 1760 gm. of 16α-methyl-21-diiodo-$\Delta^{4,9(11)}$-pregnadiene-17α-ol-3,20-dione (being a quantitative yield) were recovered. This product contained 42% of iodine (theory being 42.8%).

This compound is not described in the literature.

(B) *16α-methyl-21-acetoxy-$\Delta^{4,9(11)}$-pregnadiene-17α-ol-3,20-dione.*—880 gm. of the compound produced in step (A) were introduced into a mixture of 13.2 liters of acetone containing 1% water, 176 cc. of acetic acid and 1.32 kg. of potassium acetate. The mixture was refluxed under agitation while bubbling nitrogen therethrough in the absence of light. The steroid dissolved rapidly and the solution took a reddish-orange color. The refluxing was continued for one hour and a half, then 1.5 liters of water were added and a part of the acetone was distilled off under vacuum. Water was readded, the solution was cooled and 16α-methyl-21-acetoxy-$\Delta^{4,9(11)}$-pregnadiene-17α-ol-3,20-dione was vacuum filtered. After washing with water and drying, 620 gm. of product were obtained which were purified by solution in acetic acetone and treatment in the hot by powdered zinc. After cooling and adding water, the solution was vacuum filtered, the filter cake washed with water and dried to recover 435 gm. (being 75% by reference to the starting material of the example) of 16α-methyl-21-acetoxy-$\Delta^{4,9(11)}$-pregnadiene-17α-ol-3,20-dione which melted at 207–208° C. and had a specific rotation $[\alpha]_D^{20} = +99°$ (c.=0.5% in chloroform). This product was identical to that described by Sarett et al. (J. Am. Chem. Soc., 1958, 80, 3160).

EXAMPLE 10

(A) *Preparation of 16α,17α-methylene-21-diiodo-pregnane-3α-ol-11,20-dione, starting with the pregnane.*—Under mechanical agitation and in a stream of nitrogen, 2 gm. of 16α,17α-methylene-pregnane-3α-ol-11,20-dione, prepared as described in U.S. application Serial No. 17,269, filed March 24, 1960, were admixed with 8 cc. of absolute methanol, 1 gm. of quicklime and 2 cc. of methanol containing 10% calcium chloride. The temperature was raised to 26 to 28° C. and a solution of 2.9 gm. of iodine in a mixture of 4 cc. of pure methanol and 6 cc. of a methanolic solution of calcium chloride containing 10% calcium chloride was introduced in small fractions in proportion to the rate of absorption of the iodine. After the introduction of the iodine was terminated, the mixture was agitated again for several minutes, then cooled to about −10° C. The 21-diiodo derivative crystallized out, and was deposited at the same time as was the lime. The mixture was vacuum filtered and the filter cake was washed with iced methanol. The mixture of the 21-diiodo derivative and the lime, which remains on the filter was then introduced into a mixture of ice and water containing 15% acetic acid and was agitated for a half hour while maintaining the temperature between 0 and +5° C. The 21-diiodo derivative was vacuum filtered, the filter cake was washed with water and dried in vacuo. 1.214 gm. of the desired 16α,17α-methylene-21-diiodo-pregnane-3α-ol-11,20-dione were obtained which were found to titrate at 41.2% iodine (theoretical content 42.56%).

The 21-diiodo derivative was insoluble in water and unstable in the presence of diluted acids and alkalis. It melted around 215 to 220° C. with decomposition.

This product is not described in the literature.

(B) *Preparation of 16α,17α - methylene - 21 - acetoxy-pregnane-3α-ol-11,20-dione, starting with the 21-diiodo derivative.*—Under mechanical agitation in a stream of nitrogen, 1 gm. of the compound produced in step A was introduced in a mixture of 20 cc. of acetone, 0.1 cc. of acetic acid and 2 gm. of anhydrous potassium acetate and the suspension was heated to reflux without stopping the agitation. After about 10 minutes of refluxing, the reaction mixture turned reddish-orange, and then gradually became colorless. At the end of an hour and a half of boiling under reflux, the solution became almost colorless. The solution was concentrated under a vacuum produced by a water aspirator pump to ¼ of its original volume, several cubic centimeters of water were added, and the mixture was precipitated by adding under agitation to a mixture of water and ice. After standing for an hour while maintaining the temperature between 0 and +5° C., the derivative was vacuum filtered, and washed with water until the wash water was free of halides, again vacuum filtered, and the filter cake was dried. 0.6 gm. of 16α,17α - methylene-21-acetoxy-pregnane-3α-ol-11,20-dione were obtained which were purified for analysis by recrystallization from ethyl acetate. After washing with ethyl acetate and drying, the product melted at 140° C. while desolvating. It then crystallized again on the block to melt at 174° C. The product had a specific rotation of $[\alpha]_D^{20} = +122.5°$ (c.=1% in chloroform) which corresponded to a specific rotation of $$[\alpha]_D^{20} = +135°$$

for the desolvated product. By drying at 135° C. it lost 9.2% of its weight of solvated ethyl acetate. The compound was also desolvated by agitating it for an hour in boiling water and then vacuum filtering while hot. The product was insoluble in water, and slightly soluble in ethyl acetate.

*Analysis.*—$C_{24}H_{34}O_5$: Molecular weight=402.51. Calculated: C, 71.61%; H, 8.51%. Found: C, 71.6%; H, 8.4%.

The present application is a continuation-in-part of applications Serial No. 3,514, filed January 20, 1960, now abandoned, and Serial No. 17,269, filed March 24, 1960.

Various modifications of the process and products of the present invention may be made without departing from the spirit or scope thereof, and it is to be understood that the invention be limited only as defined in the appended claims.

We claim:

1. 21 - diiodo - 9α-fluoro-16α-methyl-Δ$^{1,4}$-pregnadiene-11β,17α-diol-3,20-dione.
2. 21 - diiodo - 16α,17α-methylene-pregnane-3α-ol-11,20-dione.
3. 21 - diiodo - 16α - methyl-Δ$^{1,4,9(11)}$-pregnatriene-17α-ol-3,20-dione.
4. 21 - diiodo - 16α-methyl-Δ$^{9(11)}$-pregnene-3α,17α-diol-20-one.
5. 21-diiodo-Δ$^{9(11)}$-pregnene-3α,17α-diol-20-one.
6. 21 - diiodo-16α-methyl-Δ$^{4,9(11)}$-pregnadiene - 17α-ol-3,20-dione.
7. 21-diiodo-16α-methyl-5β-pregnane-3α-ol-11,20-dione.
8. 21-diiodo-Δ$^{1,4}$-pregnadiene-17α-ol-3,11,20-trione.
9. 21 - diiodo-Δ$^{1,4}$-pregnadiene-11β,17α-diol-3,20-dione.
10. The solvate of 21-diiodo-Δ$^4$-pregnene-11β,17α-diol-3,20-dione, and one molecule of carbon tetrachloride.
11. The solvate of 21-diiodo-Δ$^{1,4}$-pregnadiene-17α-ol-3,11,20-trione and one molecule of carbon tetrachloride.
12. The solvate of 21-diiodo-Δ$^{1,4}$-pregnadiene-11β,17α-diol-3,20-dione and one molecule of carbon tetrachloride.
13. A process for the production of 21-diiodo-20-keto steroids of the pregnane and allopregnane series having the formula

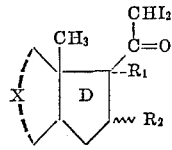

wherein X represents the remaining A, B and C rings of the pregnane molecule, said A, B and C rings being selected from the group consisting of saturated rings, mono-ene unsaturated rings and di-ene unsaturated rings and containing substituents selected from the group consisting of hydrogen, halogen, hydroxy, oxo, lower alkyl and combinations thereof and $R_1$ and $R_2$ are selected from the group consisting of hydrogen, hydroxy, lower alkanoyl and lower alkyl and when taken together are methylene, which comprises reacting a 20-keto steroid of the pregnane and allopregnane series having the formula

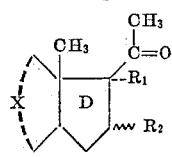

wherein X, $R_1$ and $R_2$ have the above definitions with iodine at a temperature of 0° to 40° C. in the presence of calcium chloride and at least one member selected from the group consisting of calcium oxide and calcium hydroxide in an anhydrous organic solvent to form an insoluble 21-diiodo derivative of said 20-keto steroid, adding acidic water to the reaction mixture to remove the insoluble calcium compounds as water soluble salts and recovering the insoluble 21-diiodo derivative of the said 20-keto steroid.

14. A process for the production of 21-acyloxy-20-keto steroids of the pregnane and allopregnane series having the formula

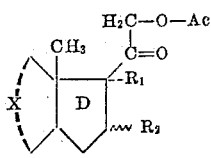

wherein X represents the remaining A, B and C rings of the pregnane series, said A, B and C rings being selected from the group consisting of saturated rings, mono-ene unsaturated rings and di-ene unsaturated rings and containing substituents selected from the group consisting of hydrogen, halogen, hydroxy, oxo, lower alkyl and combinations thereof, $R_1$ and $R_2$ are selected from the group consisting of hydrogen, hydroxy, lower alkanoyl and lower alkyl and when taken together are methylene and Ac is the acyl radical of an organic carboxylic acid containing from 1 to 12 carbon atoms, which comprises reacting a 20-keto steroid of the pregnane and allopregnane series having the formula

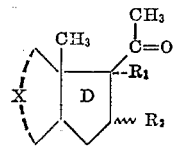

wherein X, $R_1$ and $R_2$ have the above definitions with iodine at a temperature of 0° to 40° C. in the presence of calcium chloride and a member selected from the group consisting of calcium oxide and calcium hydroxide in an anhydrous organic solvent to form an insoluble 21-diiodo derivative of the 20-keto steroid, adding acidic water to the reaction mixture to remove the insoluble calcium compounds as water soluble salts, recovering the 21-diiodo derivative of the 20-keto steroid, reacting said derivative with an alkali metal acylate of an organic carboxylic acid having from 1 to 12 carbon atoms in the presence of an inert solvent and an organic carboxylic acid having from 1 to 12 carbon atoms and recovering the 21-acyloxylated derivative of the 20-keto steroid.

15. The process of claim 14 wherein the organic solvent for the iodation step is methanol.

16. The process of claim 14 wherein the organic solvent for the iodation step is a mixture of methanol and carbon tetrachloride.

17. The process of claim 14 wherein said alkali metal acylate in an inert solvent is potassium acetate in acetone containing a small amount of acetic acid.

References Cited in the file of this patent

UNITED STATES PATENTS 2,884,429　　Nathan et al. _____ Apr. 28, 1959